Patented May 8, 1945

2,375,618

UNITED STATES PATENT OFFICE 2,375,618

METHOD FOR POLYMERIZING ROSIN

Edward A. Bried, Elsmere, Del., assignor to Hercules Powder Company, Wilmington, Del., a corporation of Delaware No Drawing. Application June 30, 1942, Serial No. 449,153

8 Claims. (Cl. 260—97)

This invention relates to a method for the polymerization of rosin and, more particularly, to an improved method for the polymerization of rosin by means of organic acid catalysts.

The prior art teaches the modification of rosin by heating it in contact with a small amount of para-toluenesulfonic acid or a closely related compound at a temperature between 100 and 300° C. to produce a material of reduced melting point, which is suitable for use in coating compositions and the like. It is also known to produce a drying oil by heating rosin with a small proportion of an aromatic sulfonic acid at 200–300° C. and then distilling off a substantially neutral oil. Heating rosin with an aliphatic carboxylic acid alone does not result in the preparation of a material of increased melting point. Thus, in none of these procedures does the product have an increased melting point in comparison with that of the unmodified rosin.

Now, in accordance with this invention, a rosin or rosin ester of substantially increased melting point in comparison with that of the untreated material is provided by contacting the rosin or rosin ester with from about 0.5 to about 30%, based upon the weight of the rosin or rosin ester, of a mixture of an organic sulfonic acid and an aliphatic carboxylic acid or a negatively substituted aliphatic carboxylic acid at a temperature within the range from about 100 to about 160° C. The polymerized rosin or rosin ester may be prepared in accordance with this method without the use of a solvent and is suitable for use in the preparation of ester gums, paper size, etc. Other advantages of the method of this invention will be described later in the specification.

Having thus indicated in a general way the nature of this invention, the following examples are given to illustrate the improved method for the polymerization of rosin and rosin esters. In the specification and in the claims, the parts and percentages are by weight unless otherwise indicated.

Example 1

Under a carbon dioxide atmosphere 166 parts of N wood rosin having an acid number of 169 and a drop melting point of 80° C., 30 parts of 100% glacial acetic acid, and 2.5 parts of para-toluenesulfonic acid monohydrate were heated with stirring at 110° C. for 5 hours. After cooling, the product was dissolved in diethyl ether, washed with water until neutral, dried over anhydrous sodium sulfate, and concentrated by distillation of the ether solvent. A polymerized rosin having an acid number of 168 and a drop melting point of 98° C. was thus prepared.

Example 2

Twenty-five parts of the N wood rosin employed in Example 1, 0.26 part of phenoxyacetic acid, and 0.26 part of para-toluenesulfonic acid monohydrate were heated at 150° C. for 3½ hours and purified in accordance with the procedure described in Example 1. The acid number of the purified product was 144 and its drop melting point was 97° C.

Example 3

One hundred eighty-eight parts of the N wood rosin employed in Example 1, 10 parts of monochloroacetic acid, and 2 parts of para-toluenesulfonic acid monohydrate were heated at 150° C. for 5 hours and purified in the manner described in Example 1. The acid number of the refined product was 142 and its drop melting point was 102° C.

Example 4

One hundred parts of the N wood rosin employed in Example 1, 26 parts of phenoxyacetic acid, and 1 part of para-toluenesulfonic acid monohydrate were heated at 150° C. for 5 hours and purified in accordance with the procedure described in Example 1. A polymerized rosin having an acid number of 129 and a drop melting point of 103° C. was produced.

Example 5

One hundred parts of the N wood rosin produced in Example 1, 1 part of phenoxyacetic acid, and 1 part of para-toluenesulfonic acid monohydrate were heated at 150° C. for 3½ hours and purified as described in Example 1. This procedure yielded a polymerized rosin having an acid number of 144 and a drop melting point of 97° C.

Example 6

One hundred parts of the N wood rosin used in Example 1, 31 parts of ortho-chlorophenoxyacetic acid, and 1 part of para-toluenesulfonic acid monohydrate were heated at 150° C. for 6 hours and refined as described in Example 1. This procedure yielded a polymerized rosin having an acid number of 113 and a drop melting point of 100° C.

Example 7

One hundred parts of the N wood rosin used in Example 1, 5 parts of monochloroacetic acid, and 1 part of para-toluenesulfonic acid monohydrate were heated at 150° C. for 5 hours and purified as described in Example 1. The product had an acid number of 146 and a drop melting point of 102° C.

Example 8

One hundred parts of the N wood rosin employed in Example 1, 15 parts of glacial acetic acid, and 1 part of para-toluenesulfonic acid were heated at 150° C. for 5 hours and purified in accordance with the procedure of Example 1. A polymerized rosin having an acid number of 168 and a drop melting point of 98° C. was produced.

The above examples illustrate the polymerization of rosin by contacting the rosin with from about 0.5 to about 30%, based upon the weight of the rosin, of a mixture of an organic sulfonic acid and an aliphatic carboxylic acid or a negatively substituted aliphatic carboxylic acid at a temperature within the range from about 100 to about 160° C. The time required for the polymerization reaction will depend upon the particular rosin employed, the specific organic sulfonic acid used, the particular aliphatic carboxylic acid or negatively substituted aliphatic carboxylic acid employed, upon the relative concentrations of these particular materials, upon the reaction temperature, upon the drop melting point desired in the final product, and upon other obvious factors. In the examples, the reaction time varied from 3½ to 6 hours, but generally any reaction period between about 5 minutes and about 24 hours may be used.

Any wood or gum rosin may be employed in place of the N wood rosin shown in the examples, and the method of this invention may also be used to increase the melting point of any of the pure rosin acids obtainable from wood or gum rosin, such as abietic acid, pimaric acid, etc. Also, the method described herein may be employed in the polymerization of any monohydric or polyhydric alcohol ester of any of the foregoing rosins or rosin acids. As such there may be polymerized the methyl, ethyl, ethylene glycol, diethylene glycol, propylene glycol, trimethylene glycol, glycerol, erythritol, pentaerythritol, etc., esters. The process of this invention is preferably employed in the polymerization of esters containing no free hydroxyl groups. The acid catalyst tends to esterify any free hydroxyl groups present in the ester, necessitating a saponification of the ester after treatment with the catalyst to remove portions of the catalyst and to provide a polymerized ester of increased melting point.

The polymerization may be conducted by contacting the rosin or rosin ester with a mixture of an organic sulfonic acid and an aliphatic carboxylic acid or a negatively substituted aliphatic carboxylic acid. Hence, in place of the para-toluenesulfonic acid monohydrate used in the examples, there may be employed the benzene, naphthalene, anthracene, dodecane, etc., sulfonic acids. As the aliphatic carboxylic acid or negatively substituted aliphatic carboxylic acid, there may be utilized formic, acetic, propionic, the butyric, etc., acids and the negative substitution products of such acids substituted with the naphthoxy, methoxy, fluoro, chloro, bromo, iodo, sulfo, cyano, phenyl, etc., groups. The ratio of organic sulfonic acid to aliphatic carboxylic acid or negatively substituted aliphatic carboxylic acid will depend upon factors similar to those which determine the period of time during which the polymerization reaction is conducted. In general, this ratio will be within the range from about 100:1 to about 1:100, and preferably within the range from about 10:1 to about 1:15.

After the polymerization has proceeded to the desired extent, the product may be separated from the acid catalyst mixture by any suitable procedure. In the examples, the product was separated by means of a solvent and a water wash. However, the aliphatic carboxylic acid may also be removed by distillation, if volatile at temperatures below about 160° C. Other methods for the separation of the polymerized rosin or rosin ester from the reaction mixture will be evident to those skilled in the art.

Upon the separation of the polymerized rosin or rosin ester from the acid catalyst mixture, it may be further refined by means of selective solvents, such as phenol and furfural, and/or by means of adsorbents such as fuller's earth, diatomaceous earth, activated carbon, etc. The polymerized product may also be heat treated at 250-325° C. for a period of time sufficient to produce a heat bleach. If desired, the product may also be subjected to vacuum distillation to remove the unpolymerized constituents and produce a residue of higher melting point.

The polymerized rosin prepared in accordance with the method of this invention is a high melting material of substantially the same acid number as the unpolymerized rosin and may be employed in the preparation of esters, synthetic resins, sizes, adhesives, etc. The polymerized esters may be employed for similar purposes.

What I claim and desire to protect by Letters Patent is:

1. The method of increasing the melting point of a rosin which comprises contacting a rosin with from about 0.5 to about 30%, based upon the weight of the rosin, of a mixture of a sulfonic acid of an organic hydrocarbon and acetic acid at a temperature within the range from about 100 to about 160° C. for a period of time sufficient to produce substantial increase in melting point of the rosin, separating the treated rosin from said mixture of acids and recovering a rosin characterized by having an increased melting point and by being substantially free from said sulfonic acid and said acetic acid.

2. The method of increasing the melting point of a rosin ester which comprises contacting a rosin ester with from about 0.5 to about 30%, based upon the weight of the rosin ester, of a mixture of a sulfonic acid of an organic hydrocarbon and acetic acid at a temperature within the range from about 100 to about 160° C. for a period of time sufficient to produce substantial increase in melting point of the rosin ester, separating the treated rosin ester from said mixture of acids and recovering a rosin ester characterized by having an increased melting point and by being substantially free from said sulfonic acid and said acetic acid.

3. The method of increasing the melting point of a rosin which comprises contacting a rosin with from about 0.5 to about 30%, based upon the weight of the rosin, of a mixture of para-toluenesulfonic acid and acetic acid at a temperature within the range from about 100 to about 160° C. for a period of time sufficient to produce substantial increase in melting point of the rosin, separating the treated rosin from said mixture of acids and recovering a rosin characterized by having an increased melting point and by being substantially free from said sulfonic acid and said acetic acid.

4. The method of increasing the melting point of a rosin ester which comprises contacting a rosin ester with from about 0.5 to about 30%, based upon the weight of the rosin ester, of a mixture of para-toluenesulfonic acid and acetic acid at a temperature within the range from about 100 to about 160° C. for a period of time sufficient to produce substantial increase in melting point of the rosin ester, separating the treated rosin ester from said mixture of acids and recovering a rosin ester characterized by having an increased melting point and by being substantially free from said sulfonic acid and said acetic acid.

5. The method of increasing the melting point of a rosin glycerol ester which comprises contacting a rosin ester with from about 0.5 to about 30%, based upon the weight of the rosin glycerol ester, of a mixture of para-toluenesulfonic acid and acetic acid at a temperature within the range from about 100 to about 160° C. for a period of time sufficient to produce substantial increase in melting point of the rosin glycerol ester, separating the treated rosin glycerol ester from said mixture of acids and recovering a rosin glycerol ester characterized by having an increased melting point and by being substantially free from said sulfonic acid and said acetic acid.

6. The method of increasing the melting point of a material selected from the group consisting of rosin and rosin esters which comprises contacting said material with from about 0.5 to about 30%, based upon the weight of said material, of a mixture of a sulfonic acid of an organic hydrocarbon and a carboxylic acid selected from the group consisting of formic acid, acetic acid, propionic acid, butyric acid, and substitution products of said acids containing the carboxyl group and also containing one negative group substituent at a temperature within the range from about 100 to about 160° C. for a period of time sufficient to produce a substantial increase in the melting point of said material, separating the treated material from said mixture of acids and recovering said material characterized by having an increased melting point and by being substantially free from said sulfonic acid and said carboxylic acid.

7. The method of increasing the melting point of rosin which comprises contacting a rosin with from about 0.5 to about 30%, based upon the weight of said rosin, of a mixture of a sulfonic acid of an organic hydrocarbon and a carboxylic acid selected from the group consisting of formic acid, acetic acid, propionic acid, butyric acid, and substitution products of said acids containing the carboxyl group and also containing one negative group substituent at a temperature within the range from about 100 to about 160° C. for a period of time sufficient to produce a substantial increase in the melting point of said rosin, separating the treated rosin from said mixture of acids and recovering said rosin characterized by having an increased melting point and by being substantially free from said sulfonic acid and said carboxylic acid.

8. The method of increasing the melting point of a rosin ester which comprises contacting a rosin ester with from about 0.5 to about 30%, based upon the weight of said rosin ester, of a mixture of a sulfonic acid of an organic hydrocarbon and a carboxylic acid selected from the group consisting of formic acid, acetic acid, propionic acid, butyric acid, and substitution products of said acids containing the carboxyl group and also containing one negative group substituent at a temperature within the range from about 100 to about 160° C. for a period of time sufficient to produce a substantial increase in the melting point of said rosin ester, separating the treated rosin ester from said mixture of acids and recovering said rosin ester characterized by having an increased melting point and by being substantially free from said sulfonic acid and said carboxylic acid.

EDWARD A. BRIED.